Oct. 16, 1951     E. J. HICKS     2,571,574
GAP COVER ATTACHMENT FOR AUTOMOBILE SEATS
Filed Nov. 17, 1950
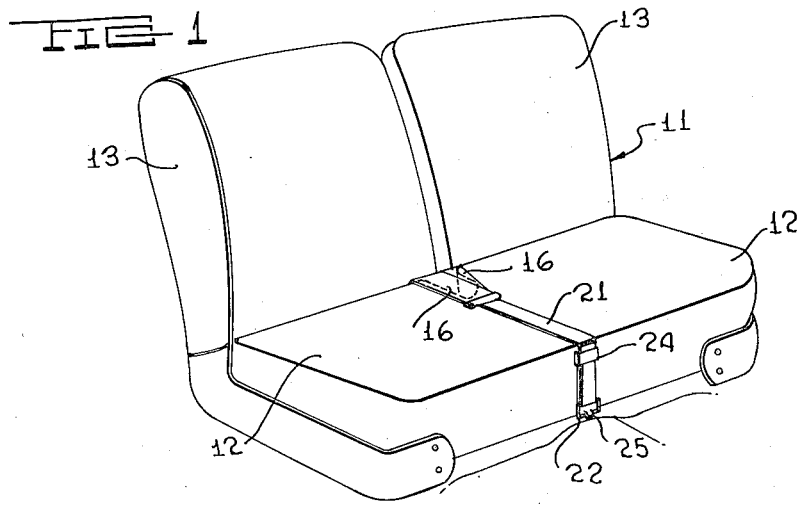
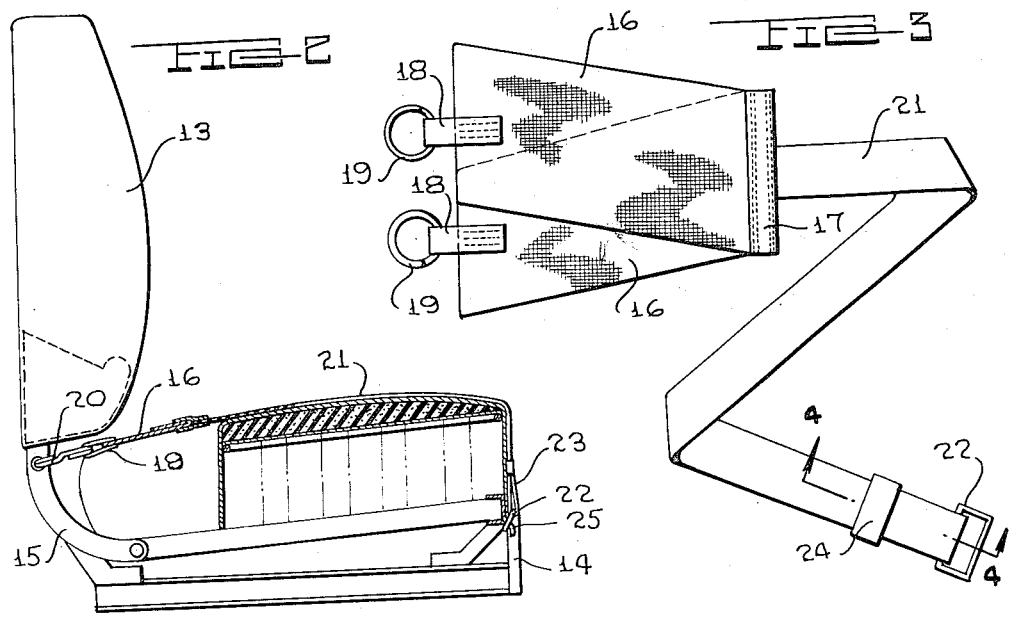
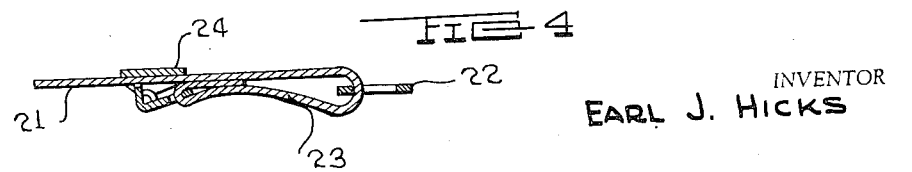
INVENTOR
EARL J. HICKS
BY
McMorrow, Berman & Davidson
ATTORNEYS Patented Oct. 16, 1951

2,571,574

UNITED STATES PATENT OFFICE 2,571,574

GAP COVER ATTACHMENT FOR AUTOMOBILE SEATS

Earl J. Hicks, Gouverneur, N. Y.

Application November 17, 1950, Serial No. 196,211

3 Claims. (Cl. 155—182)

This invention relates to automobile seats, and more particularly to automobile seats of the type having pivoted backs adapted to be swung forwardly when a passenger desires to enter the rear portion of the passenger compartment of the car.

A main object of the invention is to provide a novel and improved attachment for covering the gap between the adjoining rear portions of the seat cushions of automobile seats of the type having respective pivoted seat backs adapted to be swung forwardly over the cushions when a person desires to enter the rear portion of the automobile passenger compartment, said attachment being simple in construction, being easy to install, and providing an effective closure of the gap between the adjoining rear portions of the seat cushions, thereby preventing debris, such as dirt, matches, and similar objects from falling between the seats.

A further object of the invention is to provide an improved device for closing the gap between the adjoining rear portions of seat cushion elements of automobile seats of the type having pivoted backs, the device being inexpensive to manufacture, being inconspicuous in appearance, and being sturdy in construction.

Further objects and advantages of the invention will become apparent from the following description and claims, and from the accompanying drawings, wherein:

Figure 1 is a perspective view of an automobile seat provided with an improved gap-covering attachment constructed in accordance with the present invention;

Figure 2 is a vertical transverse cross-sectional view taken through the automobile seat of Figure 1, and through the gap-covering attachment of the present invention;

Figure 3 is an enlarged detail view of the gap-covering attachment used in Figures 1 and 2;

Figure 4 is an enlarged cross-sectional detail view taken on line 4—4 of Figure 3.

Referring to the drawings, 11 designates a conventional automobile seat of the type having the respective seat cushions 12, 12 arranged in side-by-side relation and having the respective pivoted seat backs 13, 13 adapted to be swung forwardly over the respective cushions when a person desires to enter the rear portion of the automobile or to leave the rear portion of the automobile. The seat is provided with a suitable frame, shown generally at 14, and the pivoted backs 13 are connected by respective arms 15 to the lower portion of the frame 14, as shown in Figure 2.

Due to the necessity for the pivoted backs 13, 13 to be swung forwardly at times over the seat cushions, and due to the manner of construction of the seat cushions 12, 12, ordinarily a considerable gap is left between the adjoining rear portions of the seat cushions 12, 12, and this gap affords entry for various types of debris, such as dirt, matches, keys, and other miscellaneous objects. In the course of time a large amount of such materials accumulates beneath the seat cushions and in the space between the seats.

In accordance with the present invention, a cover is provided for the space between the seat cushions, said cover serving to seal or close the space between the adjoining rear portions of the seat cushions. As shown in the drawings, the cover device may comprise a pair of relatively wide, flexible bands 16, 16 secured together at their front edges by a transverse tape section 17 stitched to the front edges of the band members 16, 16, the band members being arranged in overlapping rearwardly diverging relation, as shown in Figure 3. Secured to the rear edges of the band members 16, 16 are the respective loops 18, 18 to which are connected the rings 19, 19. The rings 19 may be secured to the arm portions 15 of the pivoted seat backs 13 by suitable connectors 20 which may comprise wires formed with loops at their ends respectively engaged with the rings 19 and with apertures formed in the arms 15, or which may directly engage the loops 18 in the manner shown in Figure 2. Secured to the mid-portions of the front edges of the bands 16, 16 is one end of an elastic band 21. The opposite end of the band is provided with a rectangular ring member 22, the band being formed into a loop 23 and having an adjustable buckle fastener 24 of conventional construction, whereby the loop 23 may be varied in length. The rectangular ring 22 is engageable with a depending lug 25 secured to the frame 14 beneath the adjoining front marginal portions of the seat cushions 12, 12, as shown in Figures 1 and 2, whereby the device is secured over the adjoining margins of the seat cushions and covers the space therebetween.

The length of the band 21 may be readily adjusted by means of the buckle fastener 24, whereby the device may be used on various different models of automobile seats of the type above described.

Instead of employing the detachable cover device above described, a suitably-shaped flap of flexible material may be sewn over the gap at the adjoining rear portions of the seat cushions by stitching the side edges of the flap to the adjoining rear portions of the side edges of the seat cushions, providing a permanent cover for said gap.

Alternatively, the automobile seat cushion, at the time of manufacture, may be provided with an extra length of cloth at a point just beyond the gap.

While a specific embodiment of an improved automobile seat attachment has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In combination with an automobile seat of the type having respective seat cushions arranged in side-by-side relation, and respective pivoted seat backs adapted to be swung forwardly over the respective cushions, a flap member of flexible material secured to the adjoining rear marginal portions of the seat cushions and arranged to cover the gap between said adjoining rear marginal portions.

2. In combination with an automobile seat of the type having a frame, respective seat cushions arranged in side-by-side relation on said frame, and respective pivoted seat backs pivotally secured to said frame and adapted to be swung forwardly over the respective cushions, a flap member of flexible material disposed over the adjoining rear marginal portions of the seat cushions and arranged to cover the gap between said adjoining rear marginal portions, first fastening means connecting the rear marginal portion of said flap member to said frame below the seat backs, and second fastening means connecting the forward marginal portion of said flap member to said frame beneath the forward margins of said seat cushions.

3. A cover attachment adapted to cover the gap between the adjoining rear marginal portions of the seat cushions of an automobile seat of the type having a pair of separately pivoted seat backs comprising a pair of relatively wide flexible bands secured together at their front edges in overlapping rearwardly diverging relation, respective fasteners secured to the rear marginal portions of said bands and adapted to be connected to the frame of the seat beneath the pivoted seat backs, an elastic strap member secured to the front edges of said bands and adapted to overlie the adjoining margins of the seat cushions forwardly of said bands, and fastening means on the ends of said elastic strap member adapted to be lockingly engaged with the frame of the seat below the adjoining front marginal portions of the seat cushions.

EARL J. HICKS.

No references cited.